(12) United States Patent
Hsu et al.

(10) Patent No.: US 9,239,952 B2
(45) Date of Patent: *Jan. 19, 2016

(54) METHODS AND SYSTEMS FOR EXTRACTION OF DATA FROM ELECTRONIC IMAGES OF DOCUMENTS

(75) Inventors: Chin Hsu, North York (CA); Paul M. Ives, Toronto (CA); Deni Esposito, Richmond Hill (CA)

(73) Assignee: DST Technologies, Inc., Kansas City, MO (US)

(*) Notice: Subject to any disclaimer, the term of this patent is extended or adjusted under 35 U.S.C. 154(b) by 570 days.

This patent is subject to a terminal disclaimer.

(21) Appl. No.: 13/006,848

(22) Filed: Jan. 14, 2011

(65) Prior Publication Data

US 2012/0183211 A1    Jul. 19, 2012
US 2013/0170741 A9    Jul. 4, 2013

Related U.S. Application Data

(63) Continuation-in-part of application No. 12/859,328, filed on Aug. 19, 2010, which is a continuation-in-part of application No. 12/695,009, filed on Jan. 27, 2010.

(51) Int. Cl.
*G06K 9/46* (2006.01)
*G06K 9/00* (2006.01)

(52) U.S. Cl.
CPC ................................ *G06K 9/00449* (2013.01)

(58) Field of Classification Search
None
See application file for complete search history.

(56) References Cited

U.S. PATENT DOCUMENTS

| | | | |
|---|---|---|---|
| 5,631,984 A * | 5/1997 | Graf | G06K 9/00449 382/317 |
| 5,768,416 A | 6/1998 | Lech et al. | |
| 6,512,848 B2 * | 1/2003 | Wang | G06K 9/00456 358/462 |
| 6,912,308 B2 * | 6/2005 | Reintjes | G06F 3/0488 382/181 |
| 7,778,953 B2 * | 8/2010 | Fujiwara | G06F 17/2775 382/176 |
| 2004/0240735 A1 | 12/2004 | Medina | |
| 2007/0168382 A1 * | 7/2007 | Tillberg | G06F 17/30253 |
| 2007/0171473 A1 * | 7/2007 | Iwasaki | G06F 17/30011 358/1.18 |
| 2007/0206884 A1 * | 9/2007 | Kato | G06K 9/72 382/305 |
| 2008/0008391 A1 * | 1/2008 | Geva | G06K 9/2054 382/224 |
| 2011/0182500 A1 * | 7/2011 | Esposito | G06K 9/00442 382/159 |
| 2011/0182508 A1 * | 7/2011 | Ives | G06K 9/00442 382/164 |

* cited by examiner

*Primary Examiner* — Jayesh A Patel
(74) *Attorney, Agent, or Firm* — Lempia Summerfield Katz LLC

(57) ABSTRACT

A system for extracting data from a document may include a memory, an interface, and a processor. The processor may identify one or more landmarks based on predefined characteristics that are associated with known landmarks. After one or more landmarks are defined, business rules may indicate one or more areas that may contain data to be extracted. The business rules may also indicate the type of data in the area and processing methods that may be used to extract the data. After determining the business rules, the processor may determine whether the data is in the area and/or extract the data.

37 Claims, 7 Drawing Sheets

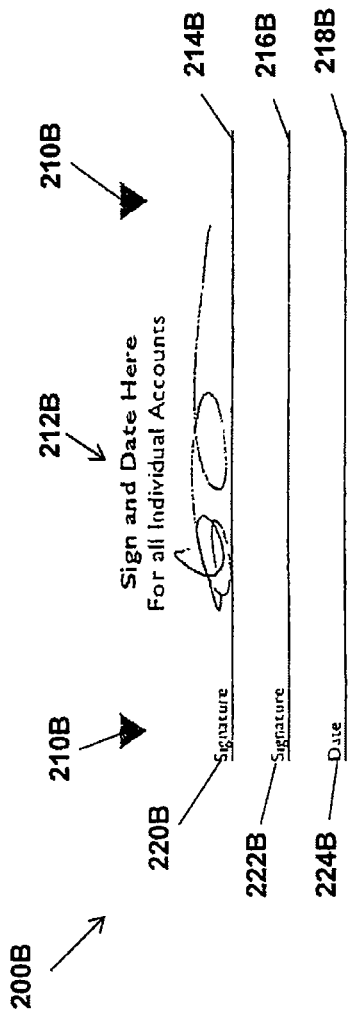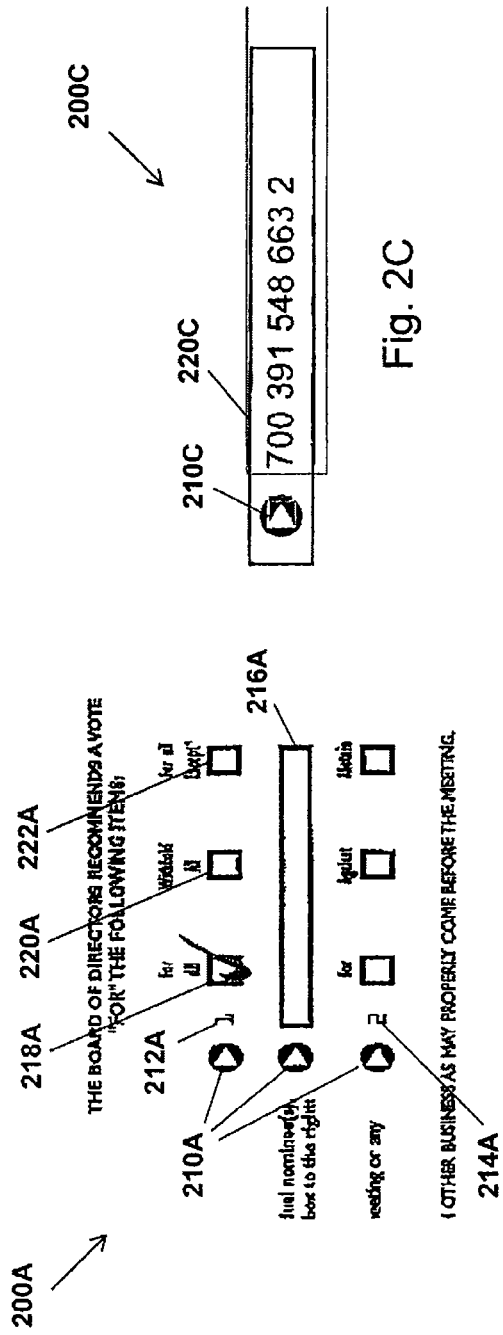

METHODS AND SYSTEMS FOR EXTRACTION OF DATA FROM ELECTRONIC IMAGES OF DOCUMENTS

RELATED APPLICATIONS

This application is a continuation-in-part of Prior application Ser. No. 12/859,328, filed Aug. 19, 2010, which in turn is a continuation-in-part of Prior application Ser. No. 12/695,009, filed Jan. 27, 2010.

TECHNICAL FIELD

The present description relates generally to extraction of data using landmarks, such as a system and method, generally referred to as a system, for extracting information from an electronic image, and more particularly, but not exclusively, to extracting information from a document represented by an electronic document image.

BACKGROUND

Although many transactions formerly performed using physical documents are now performed online or otherwise electronically, there still remain many transactions which are mainly performed using physical documents. For example, documents used in a transaction requiring an actual signature of a person may typically be performed via the exchange of physical documents bearing the requisite signature. In some cases, the document may also include one or more markings, such as a box being checked, a choice being circled, or a circle being filled to indicate a selection by the person.

These transactions may be performed using forms containing pre-printed typographic elements, e.g. fields, upon which a person may provide handwritten information, make one or more handwritten selections and/or provide a handwritten signature. An exemplary document is a proxy form that authorizes a named proxy to vote a person's shares in a company as if the person were using the form to vote. The proxy form may include, among other information, checkmarks or "Xs" inside boxes that indicate voting selections, typographical information such as unique identification numbers, and handwritten information such as signatures.

The forms may be physically sent to a receiving organization that handles and collates the forms. The receiving organization may be provided or contracted by an organization that receives physical forms. Upon receiving the forms, the organization may validate, e.g. review, each form to determine that the form was filled out correctly and contains any required information. The organization may input the typographical and/or handwritten information into a database having fields corresponding to the fields of the form or otherwise record that the form was validated. Since the number of forms received by the receiving organization can number well into the hundreds of thousands, the receiving organization may desire an efficient mechanism for extracting the desired data from the forms.

BRIEF DESCRIPTION OF THE DRAWINGS

The system and/or method may be better understood with reference to the following drawings and description. Non-limiting and non-exhaustive descriptions are provided in reference to the following drawings. The components in the figures are not necessarily to scale, emphasis instead being placed upon illustrating principles. In the figures, like referenced numerals may refer to like parts throughout the different figures unless otherwise specified.

FIG. 2A is an illustration of an electronic document image of a document containing landmarks and areas that may contain checkmarks.

FIG. 2B is an illustration of an electronic document image of a document containing landmarks and areas that may contain a signature or a date.

FIG. 2C is an illustration of an electronic document image of a document containing landmarks and an area that may contain typographical information.

DETAILED DESCRIPTION

Figure 1:
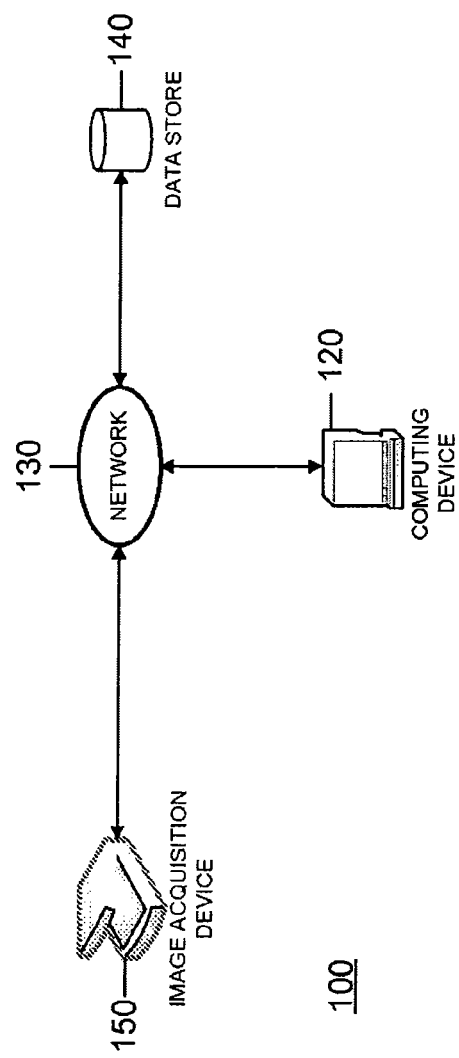
FIG. 1 is a block diagram of a general overview of an exemplary system for extracting data using a landmark.

The disclosed embodiments relate to a system for using one or more indicia printed or otherwise provided or indicated on or contained within a document to indicate one or more areas on the document that may contain data, to determine whether data is in those areas, to determine the type/context of the data, to determine whether there are errors in the document containing the data, and/or to extract the data from those areas. Prior systems use indicia, such as circles, squares, and triangles, on documents only to identify the type/context of data that is already extracted from a document. Because the extraction process does not determine what the extracted data represents—i.e., an extraction process may determine characters or words in the document, but not what the characters and/or words represent, such as a name, an address, a telephone number, etc.—then after the data is extracted, the extracted data is stored, and the system searches for indicia that indicate the context of the stored data. After identifying the indicia, the context of the extracted data is determined.

In prior systems, indicia may be used only to identify the type or context of the extracted data. In such systems, the data is extracted and stored before any attempt to recognize the indicia and determine the context of the data is made. Given that data may have different types, the data may be typographical or handwritten, and/or the data may be represented in different formats (e.g., letters, numbers, symbols, etc.), different types of extraction methods may be needed. As such, several extraction methods may be performed over the entire document in order to completely extract the information before the symbols identifying the context of the extracted data are searched. Even if only one extraction process is needed, the prior systems may perform, at a minimum, two different operations—an initial scan of the entire document to extract information, and a subsequent scan for recognizing symbols that indicate the type or context of the information.

Extracting the data and determining the type or context of the data are not both performed during a scan of the document for indicia. Additionally, the indicia are not used to determine whether the document contains an error, such as whether information is missing from or entered incorrectly on the document.

The disclosed embodiments may search for indicia before any or all of the data is extracted wherein an indicia may be identified, and data may be extracted based on the indicia. An identified indicia may indicate an area that contains the data, the process or processes used to extract the data, and/or the type or the context of the data. The area that contains the data, the process or processes used to extract the data, and/or the type or context of the data may be included as part of a set of business rules that are associated with the indicia. The extraction process determined from identifying the indicia may be performed only on the area indicated by the indicia. A scan of the document for indicia that is separate from a scan of the document for extracting data may be avoided, improving the efficiency with which the document image may be processed. During a scan of the electronic document for indicia, data is extracted from areas of the document and the content of the data is determined based on detecting the indicia. In addition, during the scan of the electronic document for indicia, the system may determine whether the document contains errors, such as whether the data is incorrectly entered or missing. When all of the indicia are detected, all of the data may be extracted. Similarly, when all of the data is extracted, all of the indicia that indicate the areas containing the data are detected. Accordingly, data may be extracted and the context of the data may be determined more efficiently.

The system for extracting data from a document may include a memory, an interface, and a processor. The memory may be operative to store an electronic document image of the document where the electronic document image includes pixels. Each pixel may have a characteristic of a plurality of characteristics. The interface may be coupled with the memory and may be operative to receive the electronic document image. The processor may be coupled with the interface and the memory and may be operative to receive, via the interface, the electronic document image of the document. The processor may identify an indicia based on predefined characteristics that are associated with known landmarks. After one or more indicia are defined, business rules may indicate one or more areas that may contain data to be extracted. The business rules may also indicate the type of data in the area and processing methods that may be used to extract the data. After determining the business rules, the processor may determine whether the data is in the area and/or extract the data.

Although not exclusively, the document containing the indicia may be represented by an electronic document image, such as a scan, facsimile or photograph of the document. For illustrative purposes the principles described herein may be referenced in the specific embodiment of typographic information and handwritten information on a document; however the principles may be embodied in many different forms. Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below.

The system may be used to extract typographical and/or handwritten information from a document using a landmark, i.e. an indicia, such as a triangle, circle, box, line, or other symbol, mark or other indicator, indicative, such as based on one or more associated business rules, of an area of the document designated for such information to be provided, described in more detail below. The system may receive an electronic document image of a document containing handwritten information and/or typographic information, such as by scanning the document with an optical scanner, digital camera or the like to convert the document to an electronic form comprised of discrete elements, i.e. pixels. The electronic document image may include a number of pixels representing the handwritten information, the typographic information and/or the background of the document. In one example, the handwritten information on the document may be information added to the document by a user, while the typographic information may be any information existing on the document prior to the user's additions. Thus, in this example the handwritten information may be represented by any pixels which are not associated with the typographic information or the background. Each pixel may have one or more characteristics, or attributes, which may describe the pixel and/or may describe information on the document represented by the pixel. For example, a characteristic of the pixel may be a color of the pixel, a position of the pixel, an orientation associated with the pixel, a characteristic of, or relationship to, a neighboring pixel, or any combination thereof. Alternatively, a characteristic of information represented by the pixel may be the type of ink used to apply the information to the document. Since the characteristics of the information represented by a pixel may not be identifiable by the pixel alone, the characteristics of the information represented by a pixel may be described in metadata associated with the pixel. Alternatively or in addition, the system may be configured such that pixels having a substantially black color, or within a range of black colors, are identified as representing typographic information, pixels having a substantially white color, or within a range of white colors, are identified as representing the background, while pixels having any non-white color or outside the range of white colors are identified as representing handwritten information.

The system may evaluate the pixels in order to detect or identify a landmark. A landmark may be generally referred to as any character, symbol, marking, or object, series of characters, symbols, markings, or objects, or any combination thereof that has a predefined set of characteristics and that may be detected and/or identified using the predefined set of characteristics. The landmark may be an indicia indicative, such as based on one or more associated business rules, of a designated area of a document in which information, such as typographical and/or handwritten information, may be found, contained within, provided on, and/or displayed. Although not to be limiting examples, the landmark may be a shape, a character, a word, a phrase, a symbol, a series of shapes, characters, words, phrases, or symbols, or any combination thereof. As another non-limiting example, a landmark may be a signature stamp, such as a STAMP2000 imprint. The predefined characteristics of a signature stamp may include a header of a signature stamp, a pattern of pixels which have a characteristic of a signature stamp, such as a bar code, or a group of pixels which have a range of color associated with a signature stamp, such as a range of green or a range of yellow associated with a STAMP2000 imprint. The predefined characteristics may include a size, an area, a number of sides, angles between sides, lengths of sides, a perimeter, a circumference, a diameter, or a radius. The predefined characteristics may include color, orientation, or a relationship to another landmark. The predefined characteristics may be determined using characteristics of the pixels, or the predefined characteristics may be the pixel characteristics themselves. The predefined characteristics may include a single pixel having certain pixel information, or may include information about the relationship between a plurality of pixels, such as information regarding color, position, or orientation associated with a plurality of pixels. The predefined characteristics may include pattern information of individual predefined characteristics, such as a color pattern.

The predefined characteristics may also include a threshold condition, such as a threshold value, a threshold number of pixels scanned, a threshold number of predefined characteristics identified, or any other threshold condition or any combination thereof that identifies or detects the landmark even though all of the predefined characteristics associated with the landmark may not be identified. As an example, if the landmark is a triangle, a threshold condition may be three sides and two angles, with each angle being less than ninety degrees. The triangle may be identified without having to determine the third angle. In another example, if the landmark is a square, a threshold condition may be two sides of equal length connected at an angle of ninety degrees. In another example, if the landmark is a circle, a threshold condition may be an arc having a certain radius of curvature. The threshold condition may be defined using pixel information. For example, the threshold condition may be an identified number of pixels all of which have a predetermined color and an identified spatial position in relation to each other. As another example, the threshold condition may indicate a threshold number of pixels in a color pattern. For example, if the landmark has a checkered pattern, the threshold condition may be a predefined number of black pixels followed by a predefined number of white pixels, followed by a predefined number of black pixels. The above described series of black, white, and black pixels may indicate the landmark having a checkered pattern even though all of the pixels making up the landmark may not be evaluated. The above mentioned predefined characteristics are not limiting and may be generally any information used in isolation or in combination with each other, or in combination with other information to identify a landmark.

A landmark may indicate a set of business rules that are associated with a landmark. The business rules may be associated with a unique landmark. Alternatively, the business rules may be associated with a single type of landmark. For example, if the landmark is a triangle, the same business rules may be associated with all of the triangles on a document or any document that has the triangles. If in the example a second landmark is a circle, a second set of business rules may be associated with the circle. In another example, one set of business rules may be associated with more than one landmark. The set of business rules may be associated with a first landmark or a second landmark. For example, if one landmark is a triangle and another landmark is a circle, one set of business rules may be associated with the triangle alone or the circle alone. Alternatively, one set of business rules may be associated with both the first landmark and the second landmark only if the two landmarks are identified together in a predetermined spatial configuration. For example, if the first landmark is a triangle and the second landmark is a circle, a first set of business rules may be associated with the triangle, a second set of business rules may be associated with the circle, and a third set of business rules may be associated with both the triangle and the circle, but only if the circle is found directly above the triangle.

A set of business rules may indicate various characteristics of the data to be extracted. For example the business rules may indicate an area on the document that the data to be extracted may be located. The area may be in reference to the document. For example, the set of business rules may indicate that the area is located in a corner of the document or in the center of the document. In another example, the set of business rules may indicate the location of the area in reference to the landmark associated with the set of business rules. The set of business rules may indicate a general location. For example, the set of business rules may indicate that the area is above, below, to the right, or to the left of the landmark. The set of business rules may also indicate a specific location. For example, the set of business rules may indicate that the center of the area is twenty pixels above the upper most edge of the landmark.

The set of business rules may indicate a shape of the area. For example, the set of business rules may indicate that the area is a rectangle, a square, a triangle, a circle, or any other term that may indicate the shape of the area. The set of business rules may also indicate a size of the area. For example, the set of business rules may indicate a perimeter, a circumference, a diameter, a radius, a surface area, a length, a width, or any other term that may indicate the size of the area.

The set of business rules may indicate information about the data to be extracted. For example, the set of business rules may indicate that the data contains typographical information or handwritten information. The set of business rules may indicate the content of the data. For example, the set of business rules may indicate that the data includes an address, an identification number, a signature, a marking, or any other kind of data that may be desired to be extracted. The set of business rules may indicate a method or set of methods needed to extract the data. For example, the set of business rules may indicate that some or all of the pixels of the area need to be scanned in order to extract the data. As another example, the set of business rules may indicate that a process such as optical character recognition (OCR) or intelligent word recognition (IWR) needs to be performed on the area in order identify characters or symbols making up some or all of the data. The set of business rules may indicate that the pixels of the area need to be scanned and a process such as OCR or IWR needs to be performed in order to extract the data. The set of business rules may indicate the order that the methods may take place. For example, the set of business rules may indicate that OCR or IWR takes place after the pixels are scanned.

The set of business rules may indicate a plurality of areas on the document from which data may be extracted. Alternatively or in addition to, the set of business rules may indicate that the data to be extracted may be located in none, only one, more than one but less than all, or all of the plurality of areas. For example, the set of business rules may indicate a plurality of areas to the right of the landmark, and whether the data to be extracted may be located in one or more than one of the areas. The set of business rules may indicate the exact location of the areas. Alternatively, or in addition to, the set of business rules may indicate that the exact location, shape, and size of the areas need to be identified. In one example, the set of business rules may indicate that the exact location, shape, and size of each of the areas may be determined by detection and identification of other landmarks, such as squares or rectangles that border each of the areas. The set of business rules may indicate that processing required to extract the data needs to be performed in each of the plurality of areas. Alternatively, the set of business rules may indicate that if data to be extracted is identified or detected in one of the areas, then processing does not need to be performed on any other areas in which processing has not yet been performed.

The set of business rules may also indicate a threshold condition, such as a threshold value, a threshold number of pixels, or any other threshold condition that indicates that all or part of the data may be successfully extracted. For example, if the area is within a box that may contain a checkmark, the set of business rules may indicate a threshold number of black pixels that, if detected, indicate that a checkmark is within the box even though not all of the pixels within the box may be evaluated.

The set of business rules may be associated with two or more landmarks. For example, a first set of business rules associated with a first landmark may indicate that a second set of business rules is available if a second landmark is detected. The first set of business rules may indicate a particular spatial position in relation to the first landmark wherein the second landmark may be located. For example, a first landmark may be detected, and a first set of business rules may indicate that a second landmark bordering the area is located to the right of the first landmark. However, the first set of business rules may not indicate the exact location, the size, or the shape of the second landmark. After the second landmark is identified, a second set of business rules associated with the second landmark or both the second landmark and the first landmark is used to indicate information about the data to be extracted. For example, a first landmark may be a triangle, and a first set of business rules may indicate that a box is located to the right of the triangle. However, the first set of business rules may not indicate the exact location, the shape, or the size of the box. If the box is thereafter detected or identified to be a square, a second set of business rules may be associated with both the triangle and the square box. In the same example, a third landmark may be a circle, the circle may have the same first set of business rules as the triangle, the first set of business rules indicating that a box is located to the right of the circle. If, after the box to the right of the circle is detected and identified, a third set of business rules associated with both the circle and the square box may indicate a set of rules that are different than the second set of business rules associated with the triangle and the square box. For example, the second set of business rules may indicate that the data to be extracted within the box is a checkmark and/or may include a threshold value for detecting the checkmark. The third set of business rules may indicate that the data to be extracted is an "X" and/or may include a threshold value for detecting the "X" that is different than the threshold value in the second set of business rules for detecting the checkmark.

In another example, a first landmark may be a box, such as a rectangle. After the rectangle is identified, a first set of business rules associated with the box may indicate that the area within the rectangle needs to be scanned for a second landmark in order to determine the area of the data to be extracted and/or information about the data. For example, if the area within the box is scanned and a second landmark may not be identified, then the first set of business rules may indicate that the area of the data to be extracted is the entire area within the box and the data to be extracted is a handwritten signature. On the other hand, if a second landmark, such as a triangle, is identified within the rectangle, then a second set of business rules associated with the triangle within the rectangle may indicate, for example, that the area of the data to be extracted is bordered by the upper and lower sides of the rectangle, the right side of the rectangle, and the right-most point or edge of the triangle. The above described example may not be limited to areas within the box. For example, the first landmark may be a box, and the first set of business rules associated with the box may indicate that an area outside of the box needs to be scanned for a second landmark in order to determine the area of the data to be extracted and/or information about the data.

The above-described examples are not limiting examples and other landmarks and/or combinations of landmarks associated with other sets of business rules may be used to identify areas of data to be extracted and/or information of the data.

The system may sort, order, collate, or index the electronic document images, and/or the associated physical documents, based on one or more properties of the electronic document images. The system may provide the sorted electronic document images to an operator, such as through an operator interface. The system may collate one or more electronic document images as being related to one another, such as a multiple pages of a single document, or multiple related documents.

FIG. 1 provides a general overview of a system 100 for extracting data using a landmark on a document. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a computing device 120, a network 130, a data store 140, and an image acquisition device 150. The computing device 120 may display or otherwise provide an operator interface for use by an operator. The image acquisition device 150 may be used to create one or more electronic document images from one or more mediums, such as paper documents, containing handwritten information and/or typographic information, or otherwise receive electronic document images from another source. Because the paper documents contain a mixture of machine printed data, i.e. typographic data, and user printed data, i.e. handwritten data, traditional optical character recognition techniques may not work effectively on the documents. The typographic information may be information printed, or applied, to the medium by a machine, such as a printer. The typographic information may be identified by one or more characteristics, such as typeface, color, point size, line length, leading space, tracking space and kerning space. The typographic information may indicate where handwritten information should be applied to the medium, such as by denoting lines, boxes or other indicators as visual cues to a user as to where handwritten information should be written. The handwritten information may be applied to the medium using a writing implement, or writing instrument, such as a pen, pencil, stylus, marker, crayon, etc. The writing implement may be a handheld device for applying information on a medium which can create a smooth, controllable line.

The image acquisition device 150 may be a device capable of converting the medium, such as a document, into an electronic document image or otherwise receiving electronic document images from another source, such as from a storage device or via a wired or wireless network. For example, the image acquisition device 150 may be a scanning or camera device. The image acquisition device 150 may be in communication with the computing device 120 and the data store 140 through the network 130. Alternatively or in addition, the image acquisition device 150 may be in direct communication with one or more of the computing device 120 or the data store 140, such as through a universal serial bus (USB) connection, a serial connection, or generally any wired or wireless data connection. Alternatively or in addition, the image acquisition device 150 may be combined with one or more of the computing device 120 or the data store 140. For example, the image acquisition device 150 may be a handheld device with a camera or scanning device which can capture an image of a document, such as an iPhone™ available from Apple, Inc, smartphones containing a camera or scanning device, a tablet device with a camera or scanning device, or generally any handheld device capable of generating an electronic document image from a physical document.

The operator may be a person responsible for monitoring the progress of the system 100, such as via an operator interface (not shown). The operator may use the operator interface to review the electronic document images generated by the image acquisition device 150. If the system 100 is unable to extract the data in one or more areas to be extracted, the operator may manually extract the data. The system 100 may store the extracted data into data fields of the data store 140 based on the detected and identified landmarks, one or more extracted sets of data, typographical information not contained in the areas of data to be extracted, or combinations thereof. The extracted data may be stored based on other information, such as the document type. The operator interface may be a graphical user interface that monitors the progress of the system 100, and manually extracts the data, if necessary.

The data store 140 may be operative to store any extracted data from the electronic document related to the system 100. The data store 140 may include one or more relational databases or other data stores that may be managed using various known database management techniques, such as, for example, SQL and object-based techniques. Alternatively or in addition the data store 140 may be implemented using one or more of the magnetic, optical, solid state or tape drives, or other storage media available now or later developed. The data store 140 may be in communication with the computing device 120 through the network 130. For example, the data store 140 may be a database server running database software, such as MICROSOFT SQL SERVER®, ORACLE®, IBM DB2® or any other database software, relational or otherwise. Alternatively or in addition, the data store 140 may be in communication with other computing devices, such as servers, through the network 130.

The network 130 may include wide area networks (WAN), such as the interne, local area networks (LAN), campus area networks, metropolitan area networks, or any other networks that may allow for data communication. The network 130 may include the Internet and/or the network 130 may be divided into sub-networks. The sub-networks may allow access to all of the other components connected to the network 130 in the system 100, or the sub-networks may restrict access between the components connected to the network 130. The network 130 may be regarded as a public or private network connection and may include, for example, a virtual private network or an encryption or other security mechanism employed over the public Internet, or the like.

The computing device 120 may be connected to the network 130 in any configuration that supports data transfer. This may include a data connection to the network 130 that may be wired or wireless. The computing device 120 may run a web application on any platform that supports web content, such as a web browser or a computer, a mobile phone, personal digital assistant (PDA), pager, network-enabled television, digital video recorder, such as TIVO®, video game console/device, automobile and/or any appliance or device capable of data communications.

The computing device 120 may be a machine that has a processor, a memory, a display, a user interface and a communication interface, such as the computing device described in FIG. 7 below. The processor may be operatively coupled with the memory, display and the interfaces and may perform tasks at the request of the standalone application or the underlying operating system. Herein, the phrase "coupled with" is defined to mean directly connected to or indirectly connected through one or more intermediate components. Such intermediate components may include both hardware and software based components. The memory may be capable of storing data. The display may be operatively coupled with the memory and the processor and may be capable of displaying information to the operator. The user interface may be operatively coupled with the memory, the processor, and the display and may be capable of interacting with an operator. The communication interface may be operatively coupled with the memory, and the processor, and may be capable of communicating through the network 130 with the image acquisition device 150. The standalone application may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an internet connection, an infra-red connection, a Bluetooth connection, or any other connection capable of transmitting data. For example, the mobile application may be an application running on an iPhone™ available from Apple, Inc.

FIGS. 2A-2C depict non-limiting examples of illustrations of electronic document images containing landmarks and areas that may contain data to be extracted. The electronic images of a medium, such as documents, may include handwritten information and typographic information. The handwritten information may be information handwritten onto the medium, such as information applied by a user performing and/or authorizing a transaction described or as instructed by the typographic information.

The typographic information may represent information generally applied to the medium by a machine, such as data applied by an inkjet printer, a laser printer, a typewriter, or generally by any device capable of applying, impressing or printing typographic information to the medium. Alternatively or in addition, the typographic information may be applied by a compositor or typesetter by hand, such as by using movable type. Alternatively or in addition, the typographic information of an electronic document image of a given document type may be the information on the electronic document image which is static, or constant, across all documents of the same document type. Conversely, the handwritten information may be the information which is unique to a particular electronic document image of a given document type, or information which is not static, or constant, across all documents of a given document type.

The handwritten information may be applied to the medium by a user using a writing implement, such as a pen, a marker, a pencil, or generally any writing implement capable of applying handwritten information to the medium. The writing implement may be a handheld instrument which can be used to create a smooth controllable line. Alternatively, the handwritten information may be applied by a device which mimics information handwritten by a writing implement. For example, the handwritten information may be applied by a pen plotter or a stamp, such as a signature stamp. For example, a document may include a stamp which includes an area for a signature and guarantees the identity of a person signing the stamp, such as a Security Transfer Agents Medallion Program (STAMP) stamp, a Stock Exchanges Medallion Program (SEMP) stamp, a Medallion Signature Program (MSP) stamp, or generally any stamp or imprint which guarantees the signature of the person signing the stamp. A STAMP, SEMP, or MSP imprint may utilize STAMP2000 technology, available from Kemark Financial Services, Inc., to deter counterfeiting. The principal security feature of the STAMP2000 technology may be its security ink. There may be two primary components comprising the security ink, a visible green pigment, and an invisible security compound that is only detectable using a STAMP2000 Transfer Agent Document Reader. A STAMP2000 imprint may also include a bar code.

Alternatively, the handwritten information may be applied by a machine. For example, a machine may apply a digital image of handwritten information to a medium, or a digital rendition of handwritten information. In one example, the handwritten information may include any information which was not on the document at the time the document was delivered to the user. Thus, any information added to the document by the user may be identified as handwritten information.

The handwritten information and/or the typographic information may be applied to the medium using one or more types of materials, or inks, such as colored ink, grayscale ink, magnetic ink, ink developed by heat, ink developed by chemical reaction, ink visible under ultraviolet light, ink visible under infrared light, ink which disturbs the surface of the paper, ink which disturbs ink on the medium, or generally any type of ink or material capable of applying information to the medium. Alternatively or in addition, the handwritten information and/or the typographic information may be applied to the medium using any material or device which disturbs the surface of the paper. For example, the surface of the paper may be disturbed by scratching or cutting the paper, or impressing the paper, such as by creating an impression on carbon or chemical-based duplication paper. Alternatively or in addition, the handwritten information may be applied by a printing device, such as an inkjet printer, a laser printer, or generally any device capable of printing on a document.

FIG. 2A illustrates an example document that has landmarks that may be used to identify areas that may contain data, to determine whether the data is in the areas, and/or to extract the data from the areas. The landmarks may be any object other than the data to be extracted. In FIG. 2A, the data to be extracted may be a marking within a box. In FIG. 2A, one of the landmarks may be a black circle with a white triangle inside the circle, denoted as landmark 210A. If landmark 210A is detected and identified by system 100, a first set of business rules associated with landmark 210A may indicate that a second landmark may be located to the right of landmark 210A. The first set of business rules may indicate that the second landmark located to the right of landmark 210A may be either a typographical number such as landmarks 212A or 214A, or a rectangle, 216A. If the system identifies landmark 212A, a second set of business rules associated with landmark 212A or alternatively, associated with the combination of landmark 210A and 212A, may indicate three areas that may contain data to be extracted. The second set of business rules may indicate the exact locations, the shapes, and the sizes of the areas. The second set of business rules may also indicate the type of data to be extracted, what processing to perform in order to extract the data, and a threshold value for determining if the area contains the data to be extracted. Alternatively, the second set of business rules may indicate that the three areas are located to the right of the landmark 212A and the exact locations, shapes, and sizes of the areas may be detected and identified after detecting a third landmark 218A, a fourth landmark 220A, and/or a fifth landmark 222A. Landmarks 218A, 220A, and 222A may be boxes around the areas and may be used to determine the exact locations, shapes, and sizes of the areas. A third set or sets of business rules may be associated with landmarks 218A, 220A, and 222A and indicate where the areas are located, the sizes of the areas, the types of data that may extracted from the areas, what processing to perform in order to determine whether data exists in the areas and/or to extract the data, and a threshold value for determining if the area contains the data to be extracted. For example, the third set of business rules may indicate that the areas are inside the landmarks 218A, 220A, and 222A, that the areas are square shaped, that the sizes of the areas are each m×m pixels, that the type of data in each area is a marking, that the pixels in the area are to be scanned to determine the colors of the pixels, and/or that a threshold of x black pixels, if detected, indicates that the area contains a marking. Alternatively, or in addition, the data may be extracted using other landmarks on the electronic document image. For example, some or all of the words located above the boxes, including: "For All," "Withhold All," "For all Except," "For," "Against," or "Abstain" may be used.

FIG. 2B illustrates another example document that has landmarks that may be used to identify areas that may contain data, to determine whether the data is in the areas, and/or to extract the data from the areas. FIG. 2B shows a document image that has landmarks that may be used to extract a signature or a date. In FIG. 2B, the landmarks may be black triangles 210B, one or more of the words in the phrase "Sign and Date Here For all Individual Accounts," denoted as landmark 212B, a first signature line 214B, a second signature line 216B, a date line 218B, the word "Signature" 220B, the word "Date" 222B, or any combination thereof. The system 100 may be configured to use any one of the identified landmarks 210B-222B, alone or in combination, to identify the areas that may contain a signature or a date. After the areas are identified, the pixels of the areas may be scanned to determine whether a signature or a date is in the area. The signature or the date may be handwritten. Alternatively or in addition, the signature or the date may be typographic. For example, the signature may be a digital signature and the signature and/or the date may be input electronically onto the document, such as by using a computer. The pixels may be identified as white or non-white to determine the pixels that may represent the date or signature. After the system 100 determines that a signature or a date is in the area, a process such as OCR or IWR may be performed in order to extract the signature or the date and/or determine the context of the signature or the date.

FIG. 2C illustrates another example document that has landmarks that may be used to identify areas that may contain data, to determine whether the data is in the areas, and/or to extract the data from the areas. In FIG. 2C, the landmarks and the area contained in the document image 200C may be used by the system 100 to locate an area that may contain a typographic identification number, and extract the typographic identification number from the area. The system 100 may scan the document 200C and identify a rectangle as landmark 210C. A first set of business rules associated with landmark 210C may indicate that the area within landmark 210C may be scanned in order to determine the area that may contain data to be extracted. For example, the pixels within landmark 210C may be scanned and landmark 220C may be identified. A second set of business rules associated with landmark 220C, or alternatively with landmark 220C and landmark 210C, may indicate that the area that may contain data to be extracted may be located within landmark 210C and to the right of landmark 220C. The second set of business rules may also indicate that the data that may located in the area may be a typographic identification number and may be extracting using OCR processing over the area.

Figure 3:
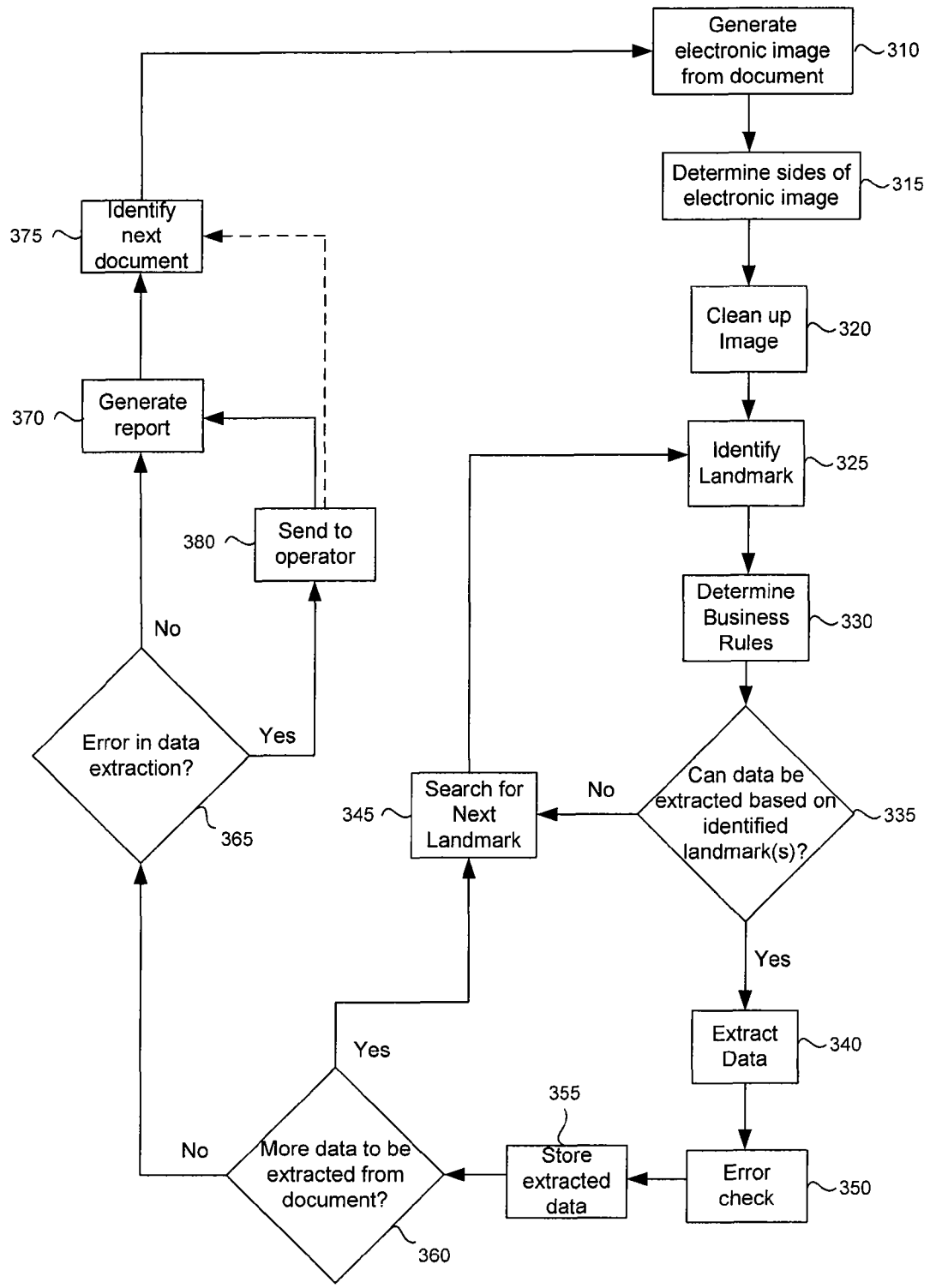
FIG. 3 is a flowchart illustrating the operations of extracting data using a landmark in the system of FIG. 1 according to one embodiment.

FIG. 3 is a flowchart illustrating the operations of extracting data using a landmark on a document in the system of FIG. 1, or other systems for extracting data using a landmark on a document. The steps of FIG. 3 are described as being performed by the computing device 120. However, the steps may be performed by the processor of the computing device 120, or by any other hardware component of the computing device 120. Alternatively the steps may be performed by an external hardware component.

At step 310, the system 100 generates an electronic document image of a medium, such as a document. For example, the image acquisition device 150 may acquire an electronic document image of a medium, such as by performing a scan on a document. The document may include information represented by multiple colors, information represented by grayscale or shades of gray, and/or non-visible information, such as information detectable by ultraviolet light, or information detectable by infra-red light. Depending on the characteristics of the information on the document, the electronic document image may utilize the RGB color space, the YCbCr color space, the HSV color space, grayscale, black and white, and/or a non-visible color space. Each pixel of the electronic document image may have one or more characteristics which may identify whether the pixel is associated with handwritten information or typographic information. For example, the color, or shade of each pixel may be used to identify the pixel as being associated with handwritten information or typographic information.

Alternatively or in addition, the image acquisition device 150 may associate metadata with each pixel. The metadata may describe characteristics of the information on the document represented by each pixel which may not be identifiable by the pixel alone. For example, the metadata may describe the type of ink used to apply the information represented by the pixel, the quantity of ink used to apply the information represented by the pixel, the composition of the document, or generally the metadata may describe any characteristic of the information on the document represented by the pixel which may not be identifiable by the pixel alone. Metadata associated with a pixel may be referred to as characteristics of the pixel.

The computing device 120 may identify a landmark by scanning the pixels comprising the electronic image of the document. The computing device may scan all or less than the entire electronic image of the document from top left to bottom right. Other scanning patterns may be performed. In one example, a predetermined number of landmarks may be associated with a document or document type. If the predetermined number of landmarks is identified, then the computing system 120 may no longer scan the pixels in the electronic document.

At step 315, the computing device 120 may determine the top, bottom, left, and right sides of the electronic image of the document image. The computing device 120 may use the sides to scan the pixels in the electronic image of the document. In one example, the computing device 120 may determine the top, bottom, left, and right sides of the electronic image of the document based on an orientation of typographic information. The computing device 120 may perform OCR over the entire document until the computing device 120 determines a known character or word. The computing device 120 may rotate the typographic information and perform OCR until the computing device 120 is able to recognize a known character or word. After the computing device 120 determines an orientation of the typographic information, the computing device 120 may identify the top, bottom, left and right sides of the electronic document image. At step 320, an image clean-up process may be performed on the electronic document image. During the clean-up process, the image may be deskewed, rotated, cropped, despeckled, denoised, or undergo any other process that improves landmark detection and/or IWR or OCR results.

At step 325, the computing device 120 may identify a landmark. The computing device 120 may identify a landmark using predefined characteristics of the landmark as described above. The predefined characteristics of landmarks known to the system 100 may be stored in data store 140. The computing device 120 may evaluate the pixels comprising the electronic document image to determine characteristics of the electronic document image that may be predefined characteristics of a landmark. The pixels identified as potentially representing a landmark may be referred to as a "landmark blob." The computing device 120 may communicate with data store 140 to access the predefined characteristics. The computing device 120 may compare the landmark blob and information associated with the landmark mark to the known predefined characteristics. The computing device 120 may identify a threshold number of predefined characteristics of a landmark to identify a landmark in the document. The steps used to identify a landmark are described in more detail below.

At step 330, the computing device 120 determines a set of business rules associated with the identified landmark. Sets of known business rules associated with sets of known landmarks may be stored in data store 140. The computing device 120 may obtain the set of business rules by accessing data store 140. At step 335, the computing device may determine data may be extracted from one or more areas based on one or more identified landmarks. If the computing device 120 determines that data may extracted based on the one or more identified landmarks, then the computing device 120 may extract the data at step 340. However, if the computing device 120 determines data may not be extracted based on the one or more identified landmarks, then the computing device 120 may search for more landmarks. As an example, referring back to FIG. 2A, after the computing device 120 identifies landmark 210A, the computing device 120 may scan for another landmark, such as one or more of landmarks 212A-222A because the business rules associated with landmark 210A may not provide the computing device 120 with enough information to extract the data.

At step 340, the data may be extracted from an identified area based on the one or more identified landmarks. From the business rules associated with the one or more identified landmarks, the computing device 120 may determine the processing methods that may be used to extract the data. One type of processing method may be region scanning, in which the computing device 120 evaluates the pixels in the area to determine whether data is contained in the area, and if so, which pixels make up the data. Another type of processing method may be character or word recognition processing such as OCR or IWR, in which the computing device determines the context of the data based on the pixels identified to be data. An additional type of processing method may involve pattern recognition or pattern matching.

At step 350, the computing device 120 may perform an error check. The error check may include determining whether data is missing. For example, a set of business rules may indicate that an area contains a signature. If the computing device 120 did not extract a signature from the area, the computing device 120 may indicate that the electronic document image does not contain a signature. As another example, a set of business rules may indicate that a mark should be in one of two areas, such as in a "Yes" box or a "No" box. If the computing device 120 does not extract data from either the "Yes" box or the "No" box, the computing device 120 may indicate that neither of the areas contain a mark. The error check may also include determining whether data is incorrectly entered. In the above described example regarding the "Yes" and "No" boxes, if the computing device extracts a mark from both boxes, the computing device 120 may indicate that data was incorrectly entered. The computing device 120 may indicate to a user that an error was detected. Any type of medium may be used to indicate a detected error to the user. For example, the computing device 120 may provide a message on a display screen that an error was detected and/or the type of error. As another example, the computing device may provide an audio message. The error message may indicate that a manual review by the user is required.

At step 355, the computing device 120 may store extracted data in data store 140. The extracted data may be stored in an extracted data field in data store 140. At step 360, the computing device 120 determines whether other data may be extracted from the electronic image document. The computing device 120 may determine whether other data may be extracted based on whether the computing device 120 has extracted all of the known data to be extracted. For example, referring back to FIG. 2B, the computing device may know, based on predefined information, that one or more signatures and a date is to be extracted. On one hand, if one or more signatures and a date is extracted, then the computing device 120 may determine that no more data is to be extracted. On the other hand, if no signatures are extracted and/or a date is not extracted, then the computing device may determine that more data is to be extracted. Alternatively or in addition, the computing device may determine whether more data is to be extracted based on whether all of the landmarks has been identified. Alternatively or in addition, the computing device 120 may determine whether other data is to be extracted based on whether all or a predetermined number of the pixels in the electronic image document has been scanned and/or analyzed. If other data may be extracted from the electronic image document, then the operation returns to step 345 and the computing device 120 scans for the next landmark.

If no other data may be extracted from the electronic image of the document, then the operation may proceed to step 365. At step 365, the computing device 120 may determine whether there were any errors in extracting data from the electronic document image. An error may be identified based on determining whether data was unable to be extracted, is missing, and/or is incorrectly entered. If the computing device 120 determines that there were no errors in extracting data, then the computing device generates a report of the data extraction at step 370. The report may include the information identifying the document and/or the data that was extracted. For example, referring back to FIG. 2A, the report may include which of the three boxes associated with landmark 210A and landmark 212A was marked. After generating the report, the computing device may proceed to step 375. At step 375, the computing device 120 may identify the next document and the operation starts over at step 310.

Alternatively, if the computing device 120 determines that there was an error in extracting data, then the computing device 120 may send the electronic document image to a user of the system 100 at step 380 for further processing. In one example, the computing device 120 may display the electronic image using a display device. The computing device 120 may also display the error that was identified. An operator may view the electronic image and/or the error that was identified by the computing device 120 and determine the data that was input and/or verify that data is missing and/or improperly entered. In one example, the display is a touchscreen interface. The operator may use the touchscreen interface to enter data that the computing device was unable to extract. Alternatively or in addition, the user may use the touchscreen interface to enter information that verifies that data is missing and/or improperly entered. The computing device 120 may process and/or store the information that was entered by the operator. After the data is sent to a user for further processing, the operation may proceed back to step 370 and generate a report of the data extraction. The report may include the data that was extracted and/or the error in the extraction that was identified. The report may include the information that was entered by the operator. In an alternative example, as shown by the dotted arrow, the computing device 120 may not generate a report when an error was detected and proceed directly to step 375 and identify the next document.

Figure 4:
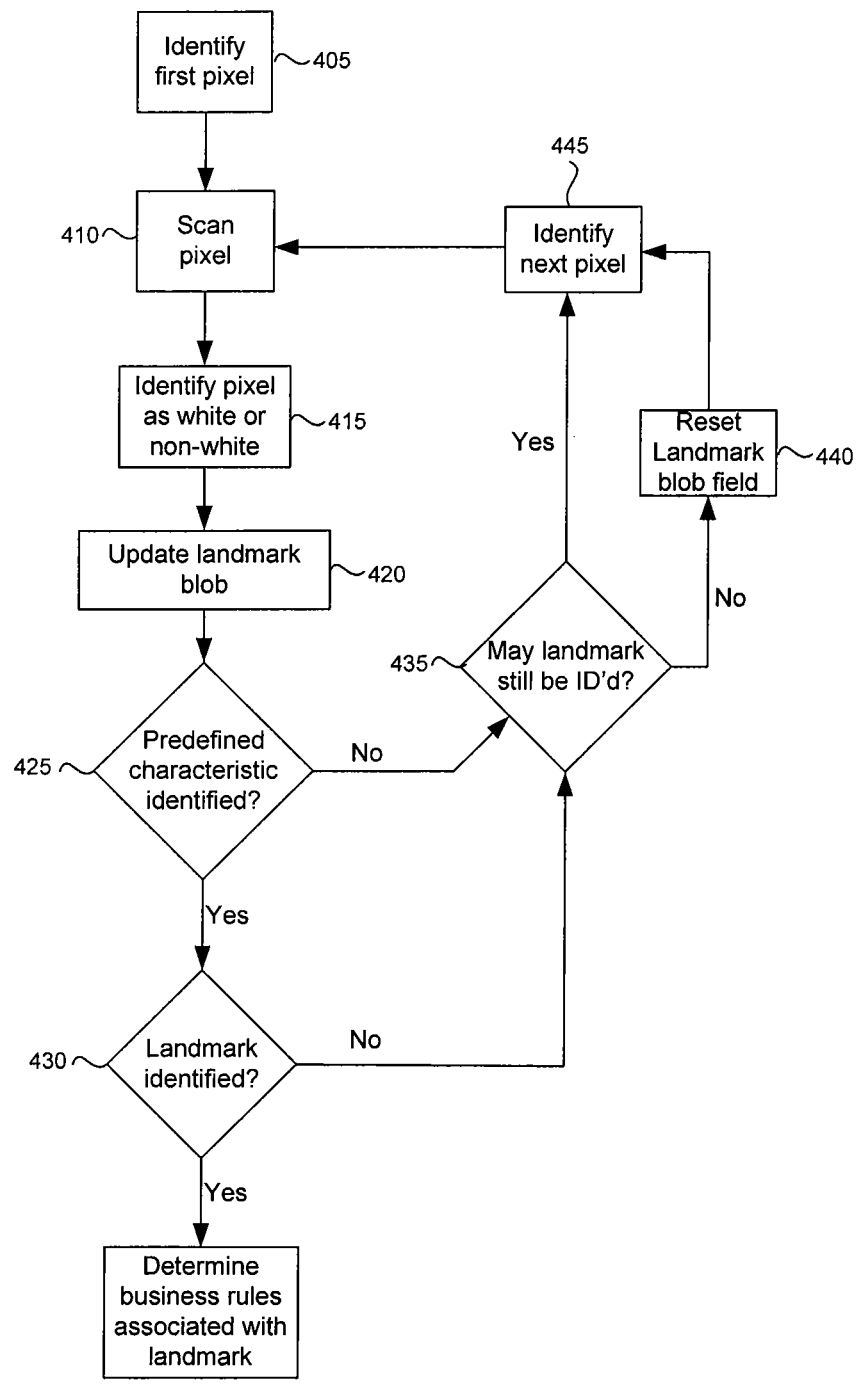
FIG. 4 is a flowchart illustrating the operations of scanning pixels to identify a landmark contained in an electronic image of a document in the system of FIG. 1 according to one embodiment.

FIG. 4 is a flowchart illustrating the operations of identifying a landmark. The steps of FIG. 4 are described as being performed by the computing device 120. However, the steps may be performed by the processor of the computing device 120, or by any other hardware component of the computing device 120. Alternatively the steps may be performed by an external hardware component.

At step 405, the computing device 120 may identify the first pixel in the electronic document image. The computing device may use the sides of the document that were identified at step 315 (FIG. 3) to identify the first pixel. At step 410, the computing device 120 may scan the pixel to determine information associated with the pixel, such as color, position, or orientation. At step 415, the computing device 120 may identify the pixel as having a white color or a non-white color. In one example, the computing device 120 identifies the pixel as having a color within a range of white colors or a color within a range of black colors.

At step 420, the computing device updates a landmark "blob" field in data store 140. Although not exclusively, a "blob" may refer to one or more pixels that may potentially represent a landmark, a predefined characteristic of a landmark, or data to be extracted. A "landmark blob" may refer to one or more pixels that may represent a landmark or a predefined characteristic of a landmark. A field in data store 140 may contain one or more landmark blobs and/or information associated with the landmark blob. The field, referred to as a landmark blob field, may be updated as the computing device 120 scans pixels to identify a landmark. The landmark blob may be stored in the landmark blob field in data store 140 until the computing device 120 identifies a landmark or determines that a landmark may not be identified with the landmark blob and associated information stored in the landmark blob field. Using FIG. 2A to illustrate, the computing device 120 may scan pixels to identify the square box 218A. As the computing device identifies black pixels that are part of the square box 218A, the landmark blob is updated.

Alternatively or in addition, the landmark blob field in data store 140 may store landmark blobs that potentially represent a predefined characteristic of a landmark. If subsequent scanning of the pixels in the document yields that the blob is not a predefined characteristic of a landmark, then the landmark blob may be removed from the landmark blob field. Alternatively, if the landmark blob is identified as a predefined characteristic, then the landmark blob may continue to be stored in the landmark blob field until the landmark is identified. Using FIG. 2A to illustrate, square box 218A may have as predefined characteristics four sides of equal length and four corners having ninety-degree angles. At a point in the scanning, the computing device may have identified only a part of a vertical side of the square box 218A. The identified part of the side is stored as a landmark blob in the landmark blob field. At a subsequent point in the scanning, the whole side may be identified. At the subsequent point, the square box 218A may not be identified even though the vertical side is identified. The vertical side, as an identified predefined characteristic, may be stored in the landmark blob field while the computing device scans more pixels to identify the landmark 218A.

At step 425, the computing device 120 may determine whether a predefined characteristic is identified. The computing device 120 may determine whether the landmark blob matches a predefined characteristic of a landmark. The computing device 120 may access the data store 140 to obtain sets of predefined characteristics associated with known landmarks. The computing device 120 may compare the landmark blob with the predefined characteristics to determine whether a match exists between the landmark blob and the predefined characteristics. The computing device 120 may be capable of eliminating potential matches as the blob is updated. If a predefined characteristic is identified, the operation may proceed to step 430 to determine if a landmark is detected.

At step 430, the computing device 120 may determine if a landmark is detected. The computing device 120 may compare the one or more identified predefined characteristics with predefined characteristics of known landmarks to determine if a landmark is detected. If the computing device 120 determines that a landmark cannot be identified, the computing device 120 may scan more pixels to identify other predefined characteristics. Using FIG. 2A to illustrate, a predefined characteristic for both the rectangular box 216A and the square box 218A may be a corner having a ninety degree angle. If the computing device has identified only the corner, the computing device may not be able to determine whether the identified corner is part of the square box or the rectangular box. The computing device may then proceed back to step 410 and scan more pixels. Once the computing device 120 determines more predefined characteristics, such as the lengths of the sides connected to the identified corner, the computing device 120 may determine that the landmark is the rectangular box and not the square box, or vice versa.

The computing device 120 may identify a landmark by detecting a threshold number of predefined characteristics. The threshold number may be all or less than all of the predefined characteristics. Using FIG. 2A to illustrate, the square boxes 218A-222A are the only landmarks on the electronic image 200A that have vertical and horizontal sides of equal length. Once the computing device 120 detects one vertical side and one horizontal side and determines that the sides are of equal length, a threshold number of predefined characteristics may be identified and the computing device may identify the landmark as the square box. However, as shown in FIG. 2A, the rectangular box 216A and the square box 218A may have equal vertical sides. If the computing device 120 has not identified the horizontal side, a threshold number of predefined characteristics has not been identified and the computing device 120 may not be able to determine whether the landmark is the square box or the rectangular box.

Referring back to step 425 in FIG. 4, if a predefined characteristic of a landmark is not identified, the operation may proceed to step 435. At step 435, the computing device 120 may determine whether a landmark may still be detected. The computing device 120 may make the determination at step 435 based on the landmark blob and associated information stored in the landmark blob field of data store 140. Referring back to FIG. 2A to illustrate, the rectangular box 216A may have a particular width-to-height ratio as a predefined characteristic. At a point in the scanning, the computing device 120 may not be able to identify the rectangular box 216A with certainty, but may determine that the landmark blob has the potential to be the rectangular box with the particular width-to-height ratio.

At step 440, the computing device 120 determined that a landmark could not be determined based on the landmark blob stored in the landmark blob field, and the landmark blob field is reset. At step 445, the computing device may identify the next pixel and the operation is repeated at step 425. If at step 435 the computing device determines that a landmark may still be identified, step 440 of the operation is skipped and the next pixel is identified at step 445.

Figure 5:
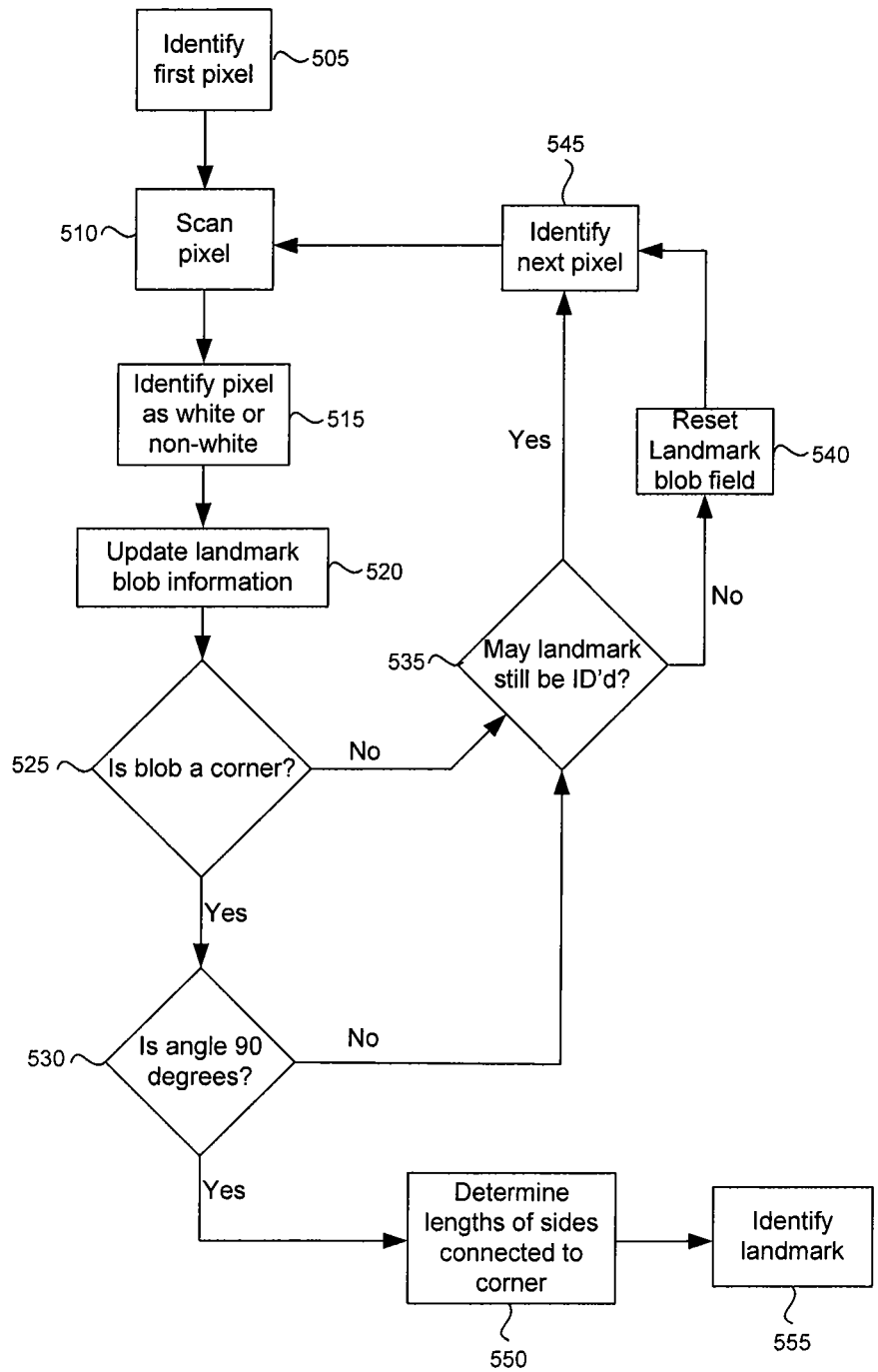
FIG. 5 is a flowchart illustrating the operations of identifying a landmark using corner detection according to one embodiment.

FIG. 5 is a flowchart illustrating the operations of identifying a landmark using corner detection. The operations in FIG. 5 may be used to identify a landmark that has a corner, such as a rectangle, a square, or a triangle. The steps of FIG. 5 are described as being performed by the computing device 120. However, the steps may be performed by the processor of the computing device 120, or by any other hardware component of the computing device 120. Alternatively the steps may be performed by an external hardware component.

At step 505, the computing device 120 may identify a first pixel in the electronic document image. The first pixel may be the pixel in the uppermost left-hand corner of the image. At step 510, the computing device 120 may scan the pixel to determine information associated with the pixel, such as color, position, or orientation. At step 515, the computing device 120 may identify the pixel as having a white color or a non-white color. In one example, the computing device 120 identifies the pixel as having a color within a range of white colors or a color within a range of black colors.

At step 520, the computing device 120 may update landmark blob information in a landmark blob field in data store 140. At step 525, the computing device 120 may determine whether the blob is a corner. A corner may be generally referred to as a point where converging lines meet. The point may be a pixel or a group of pixels that represent a meeting point or a converging point between two lines. The two lines may form an angle between the two lines that is less than 180 degrees. A corner may be a landmark. Alternatively or in addition, a corner may be a predefined characteristic of a landmark. In one example, the computing device 120 may identify a corner by identifying two lines having endpoints that intersect and form an angle between the two lines. A minimum threshold length may be determined for each of the lines before the computing device may determine that the landmark blob is a corner.

If at step 525 the computing device 120 determines that the landmark blob is not a corner, the computing device 120 may determine whether a landmark may still be detected based on the blob information stored in the landmark blob field of data store 140. At step 540, the computing device 120 may determine that a landmark may not be determined based on the stored blob in the landmark blob field, and the landmark blob field may be reset. At step 545, the computing device may identify the next pixel and the operation is repeated at step 510. If at step 535 the computing device determines that a landmark may still be identified based on the stored blob in the landmark blob field, step 540 of the operation may be skipped and the next pixel may be identified at step 545.

Referring back to step 525, if the computing device 120 identifies the blob as a corner, then the operation may proceed to step 530. At step 530, the computing device 120 may determine whether the angle of the corner is ninety degrees or substantially ninety degrees. If the computing device 120 determines that the angle of the corner is not ninety degrees or substantially ninety degrees, then the operation may proceed to step 535 to determine whether a landmark may still be identified. If at step 530 the computing device 120 determines that the angle of the corner is ninety degrees or substantially degrees, the operation may proceed to step 550. At step 550, the computing device 120 may determine the lengths of the two sides. The computing device 120 may scan the pixels that linearly extend from the identified corner. At step 555, the computing device 120 may identify the landmark. In one example, the computing device 120 may access data store 140 to determine the known landmark that has the lengths that the computing device 120 identified. If the computing device identifies more than one landmark that has two lines with the identified lengths, then the computing device 120 may perform additional scanning of the pixels to identify the landmark.

Figure 6:
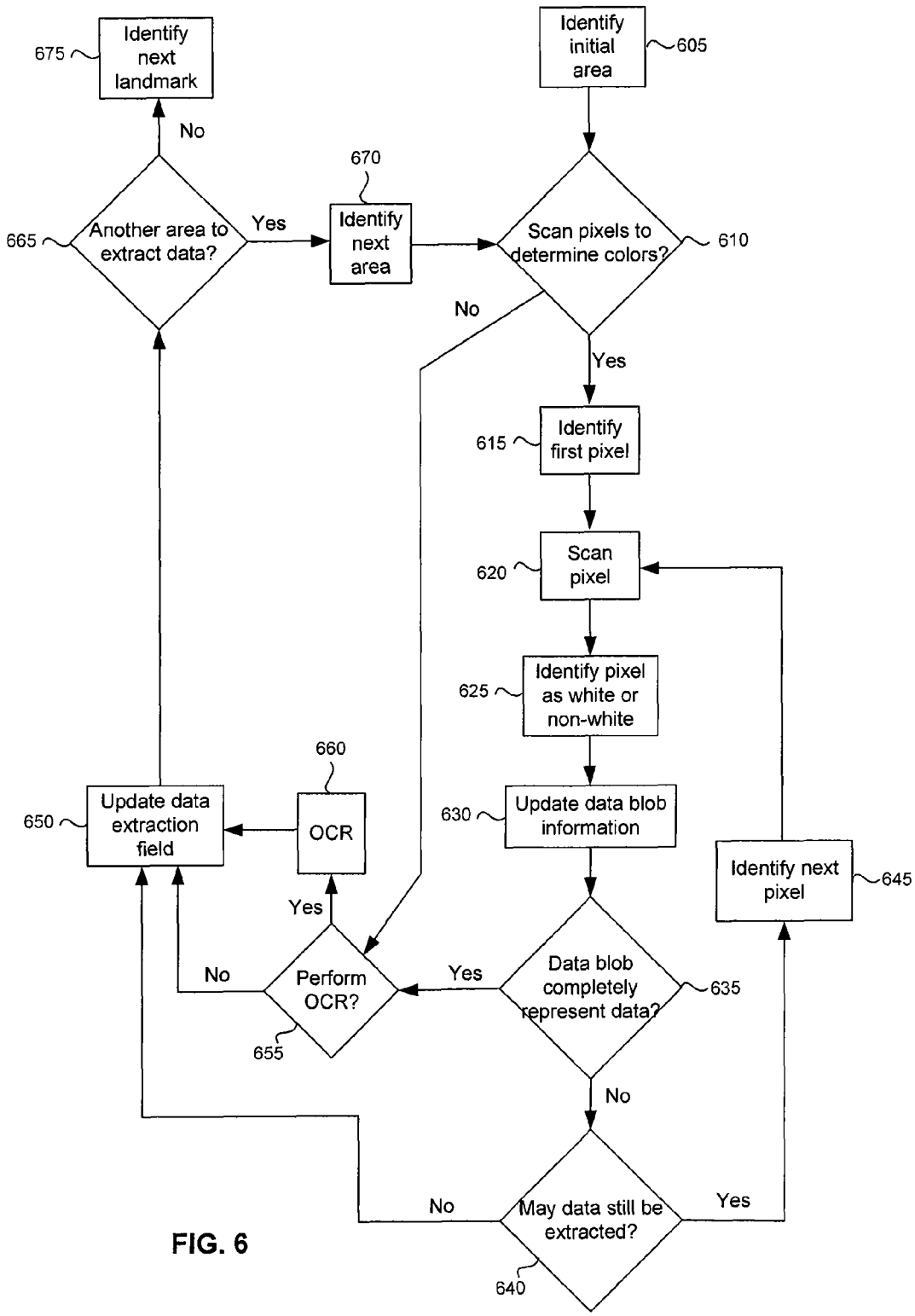
FIG. 6 is a flowchart illustrating the operations of extracting data from an area that was determined from identifying a landmark according to one embodiment.

FIG. 6 is a flowchart illustrating the operations of extracting data from one or more areas that was determined from identifying one or more landmarks. The steps of FIG. 6 are described as being performed by the computing device 120. However, the steps may be performed by the processor of the computing device 120, or by any other hardware component of the computing device 120. Alternatively the steps may be performed by an external hardware component.

At step 605, a first area determined from identifying one or more landmarks may be identified. At step 610, the computing device 120 may determine whether the colors of the pixels in the area need to be determined. The computing device may make the determination at step 610 from the set of business rules associated with the identified one or more landmarks. The computing device 120 may determine the white pixels from the non-white pixels when an OCR process may not be able to extract the data. Using FIG. 2A to illustrate, the computing device 120 may determine whether the square boxes 218A-222A contain a mark. The OCR process may not determine whether a mark is in each of the square boxes 218A-222A. Instead, the computing device 120 may scan the pixels in each of the square boxes 218A-222A to determine the colors of the pixels. The computing device 120 may determine whether the square boxes 218A-222A have a mark by determining whether the area inside the square boxes 218A-222A have a threshold number of black pixels. Using FIG. 2B to illustrate another example, the computing device 120 may not be able to extract a handwritten signature or date by performing only an OCR process over the areas. The computing device 120 may scan the pixels in the areas to identify the non-white pixels that may represent the signature or the date. The computing device 120 may perform an OCR process over the areas after the black pixels are identified.

At step 615, an initial pixel may be identified. At step 620, the pixel may be scanned and the characteristics of the pixel may be determined. The characteristics of the pixel may include color, position, or orientation. At step 625, the computing device 120 may identify the pixel as having a white color or a non-white color. In one example, the computing device 120 identifies the pixel as having a color within a range of white colors or a color within a range of black colors. The computing device may identify the colors of the pixels to separate the pixels that represent the background of the document from the pixels that represent the foreground of the document. In one example, the background is represented by white pixels and the foreground is represented by non-white pixels.

At step 630, a data blob may be updated in a field in the data store 140 with the characteristics of the scanned pixel. The data blob may be one or more pixels that may represent data to be extracted. The field, referred to as a data blob field, may store the data blob and information associated with the pixels comprising the data blob. When the computing device 120 identifies a pixel that may represent the background, the computing device 120 may not consider the pixel to be part of the data to be extracted. The computing device 120 may not update the data blob field when the computing device 120 scans a pixel that represents the background of the document. When the computing device 120 identifies a pixel that may represent the foreground, the computing device 120 may consider the pixel to be part of the data. The computing device 120 may update the data blob with the pixel. Alternatively or in addition, the data blob may consist of both white pixels and non-white pixels. In one example, the computing device 120 updates the data blob when a non-white pixel is scanned and does not update the data blob when a white pixel is scanned. Alternatively, the computing device 120 updates the data blob when a white pixel is scanned and does not update the data blob when a non-white pixel is scanned. In another example, the data blob is updated when either a white pixel or a non-white pixel is scanned.

At step 635, the computing device 120 may determine whether the data blob completely represents the data. In one example, the computing device 120 may not be able to determine whether the data blob completely represents the data to be extracted until all of the pixels in the area are scanned. Although not exclusively, the computing device 120 may not be able to determine whether the data blob completely represents the data to be extracted in situations where identifying both the presence of the data and the context of the data is desired. Using FIG. 2B to illustrate, the computing device 120 may not be able determine whether the data blob represents the complete signature without scanning the entire area identified as containing a signature. Alternatively, the computing device 120 may be able to determine whether the data blob completely represents the data to be extracted without scanning all of the pixels in the area. Although not exclusively, the computing device 120 may be able to determine whether the data blob completely represents the data to be extracted without scanning all of the pixels in the area in situations where identifying only the presence of the data is desired. Using FIG. 2A to illustrate, a mark inside the square box 218A may be determined by identifying a threshold number of black pixels. The computing device 120 may be able to determine whether the threshold number is met or whether the threshold number may not be met without the computing device scanning all of the pixels in the box.

If the computing device 120 determines that the blob does not completely represent the data, the operation may proceed to step 640. At step 640, the computing device 120 may determine whether data may still be extracted from the area. If the computing device 120 determines that data may not still be extracted, then the computing device 120 determines that the area does not contain information to be extracted. Using FIG. 2A to illustrate, the computing device 120 may scan the area within the square box 218A. A set of business rules associated with the square box 218A may indicate a threshold number of black pixels that may be identified to determine whether the box 218A contains a checkmark. At a point during the scan, the computing device 120 may have identified a number of black pixels that is less than the threshold number of pixels. However, based on the number of pixels yet to be scanned, the computing device 120 may determine whether there is still potential for the threshold number of black pixels to be identified. If the computing device 120 determines that the threshold number of black pixels may not be identified, then the computing device 120 may determine that the area within the square box 218 does not contain a checkmark. At step 650, a data extraction field in the data store 140 is updated to indicate that the area being scanned is empty. Alternatively, if the computing device 120 determines that data may still be extracted from the area, the operation proceeds to step 645. At step 645, the next pixel is identified. The operation goes back to step 620 where the pixel is scanned for pixel information.

Referring back to step 635, if the computing device 120 determines that the data blob completely represents the data to be extracted, the operation may proceed to step 655. At step 655, the computing device 120 may determine whether an OCR process may be performed over the data blob to extract the data. The computing device 120 may decide to perform an OCR process over the area from the set of business rules associated with the identified landmark. Using FIG. 2B to illustrate, if handwritten information such as a date was written above the date line 218B before the document was electronically scanned, the computing device 120 may initially identify the white pixels and the non-white pixels to determine which pixels represent the handwritten date. Subsequently, the computing device may perform an OCR process to determine the context of the handwritten information. If the computing device 120 determines that an OCR process may be performed, then the operation proceeds to step 660 and an OCR process is performed on the data blob. The context of the data blob, such as the characters and symbols that the data blob may represent, may be extracted from the OCR process. At step 650, the extracted data field is updated with the extracted data. If at step 655 the computing device 120 determined that an OCR process does not need to be performed on the data blob, the OCR process may be skipped and the extracted data field in the data store 140 may be updated at step 650.

At step 665, the computing device may determine whether the business rules indicate that another area is to be analyzed for data extraction. If more areas may be scanned, then the next area is identified at 670 and the operation is repeated at 610. If the computing device 120 determines that no more areas may be analyzed for data based on the landmark or landmarks that were identified, the computing device 120 may identify more landmarks.

Figure 7:
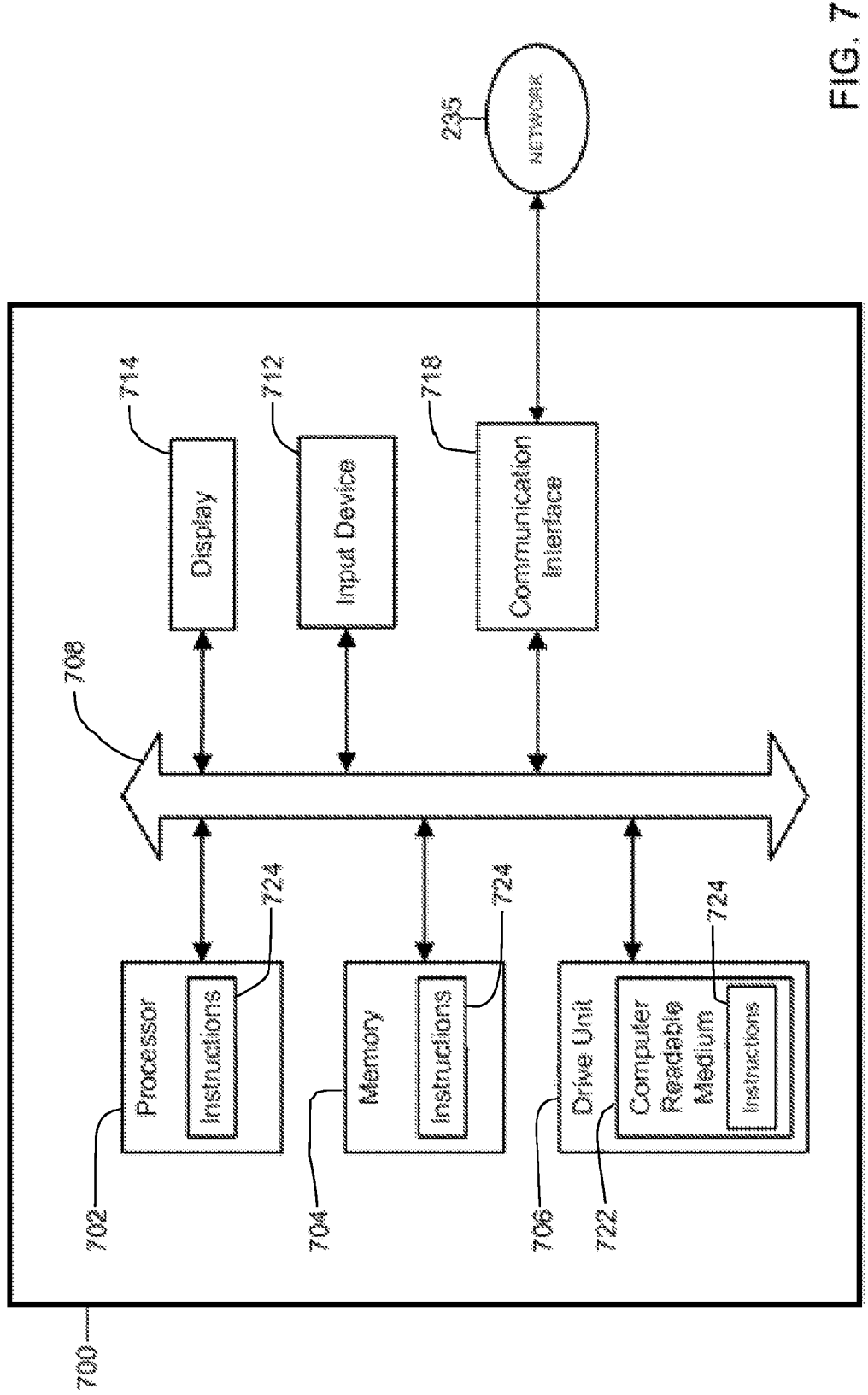
FIG. 7 is an illustration of an exemplary general computer system that may be used to implement the systems of FIG. 1, or other systems for extracting data using a landmark on a document.

FIG. 7 illustrates a general computer system 700, which may represent the computing device 120, or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server, the service provider server may communicate with users through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of extracting data from an electronic image of a document, the document having at least one indicium therein indicative of one or more designated areas, separate from the indicium, in which the data may be found, the method comprising:
   (a) identifying each of the at least one indicium;
   (b) determining, for each identified indicium, at least one rule associated with the identified indicium, wherein each of the determined at least one rule provides information regarding the data to be extracted and designates the one or more areas, separate from the indicium, in which the data to be extracted may be found, and each of the at least one rule further provides, wherein the information regarding the data to be extracted comprises type of data to be extracted, for how to extract the data, threshold for determining if the area contains the data to be extracted, or combinations thereof; and
   (c) extracting data from only the designated one or more areas of the electronic image, wherein at least a portion of the information provided by the determined at least one rule guides extraction of the data from the one or more areas designated thereby.

2. The method of claim 1, wherein identifying each of the at least one indicium comprises determining whether a set of pixels of a plurality of pixels matches a known indicium, the plurality of pixels comprising the electronic image of the document.

3. The method of claim 1, wherein identifying each of the at least one indicium comprises identifying at least one predefined characteristic associated with the at least one indicium.

4. The method of claim 3, wherein identifying each of the at least one indicium comprises identifying a threshold number of predefined characteristics associated with the at least one indicium.

5. The method of claim 1, wherein identifying each of the at least one indicium comprises:
   (i) scanning a pixel of a plurality of pixels, the plurality of pixels comprising the electronic image of the document;
   (ii) identifying a color value associated with the pixel of the plurality of pixels;
   (iii) determining whether the pixel may be part of the at least one indicium based on the color value associated with the pixel;
   (iv) updating a set of pixels of the plurality of pixels based on determining that the pixel may be part of the at least one indicium;
   (v) determining whether a match between the set of pixels and the at least one indicium can be determined;
   (vi) determining whether the set of pixels matches the at least one indicium when the match can be determined; and
   (vii) identifying a next pixel and repeating steps (i)-(v) using the next pixel if the match cannot be determined.

6. The method of claim 5, wherein the determining of whether a match between the set of pixels and the at least one indicium can be determined comprises:
   determining whether a match between the set of pixels and a predefined characteristic of the at least one indicium can be determined; and
   determining whether the set of pixels matches the predefined characteristic if the match can be determined.

7. The method of claim 5, wherein determining whether the pixel may be part of the at least one predefined characteristic comprises determining whether the pixel has a non-white color value.

8. The method of claim 6, wherein determining whether the pixel may be part of the at least one predefined characteristic comprises determining whether the pixel has a value within a range of black color values.

9. The method of claim 1, wherein the at least one rule indicates one or more areas that may contain handwritten information.

10. The method of claim 1, wherein the at least one rule indicates one or more areas that may contain typographic information.

11. The method of claim 1, wherein the at least one rule indicates at least one of:
   an area on the document that may contain information;
   a size of the area;
   a shape of the area;
   whether the data comprises handwritten information;
   whether the data comprises typographic information;
   a processing method to extract the information;
   a threshold condition indicating that the data can be extracted;
   a second indicium needed to extract the data; or
   combinations thereof.

12. The method of claim 1, wherein identifying each of the at least one indicium comprises:
   identifying a predefined characteristic of the at least one indicium as a corner; and
   determining the lengths of two sides in connection with the corner.

13. The method of claim 3, wherein identifying the at least one predefined characteristic comprises determining whether a set of pixels of a plurality of pixels matches a known predefined characteristic, the plurality of pixels comprising the electronic image of the document.

14. The method of claim 1, wherein the extracting of the data from the one or more designated areas on the electronic image of the document comprises identifying color values of pixels in the one or more designated areas.

15. The method of claim 1, wherein the extracting of the data from the one or more designated areas on the electronic image of the document comprises:
   (i) scanning a pixel of a plurality of pixels, the plurality of pixels comprising the one or more designated areas;
   (ii) identifying a color value associated with the pixel;
   (iii) determining whether the pixel may be part of the data based on the color value associated with the pixel;
   (iv) updating a set of pixels of the plurality of pixels based on determining that the pixel may be part of the data;
   determining whether the set of pixels completely represents the data;

(vi) identifying a next pixel and repeating steps (i)-(v) using the next pixel if the set of pixels does not completely represent the data; and (vii) determining whether to perform an OCR process on the set of pixels.

16. The method of claim 1, further comprising:

(d) identifying a second indicium;

(e) determining at least a second rule associated with the second indicium; and (f) extracting data from the one or more designated areas using the second rule.

17. The method of claim 1, further comprising:

(d) performing an error check, wherein the error is selected from the group consisting of data was unable to be extracted from the image of the document, data is missing from the document, data is incorrectly entered on the document, and combinations thereof.

18. The method of claim 1, further comprising:

(d) generating a report of the data extraction, wherein the report comprises information selected from the group consisting of information identifying the document, data that was extracted, an error that was detected during data extraction, and combinations thereof; and wherein the error is selected from the group consisting of data was unable to be extracted from the image of the document, data is missing from the document, data is incorrectly entered on the document, and combinations thereof.

19. A system for extracting data from an electronic image of a document, the document having at least one indicium therein indicative of one or more designated areas, separate from the indicium, in which the data may be found, the system comprising:

a processor;

a non-transitory memory coupled with the processor and having computer program instructions stored therein and executable by the processor to cause the processor to (a) identify each of the at least one indicium as a result of execution by the processor of first logic stored in the non-transitory memory;

(b) determine, for each of the identified indicium, at least one rule associated with the identified indicium as a result of execution by the processor of second logic stored in the non-transitory memory, wherein each of the determined at least one rule provides information regarding the data to be extracted and designates the one or more areas, separate from the indicium, in which the data to be extracted may be found, and each of the at least one rule further provides, wherein the information regarding the data to be extracted comprises type of data to be extracted, for how to extract the data, threshold for determining if the area contains the data to be extracted, or combinations thereof; and (c) extract data from only the designated one or more areas of the electronic image as a result of execution by the processor of third logic stored in the non-transitory memory, wherein at least a portion of the information provided by the determined at least one rule guides extraction of the data from the one or more areas designated thereby.

20. The system of claim 19, wherein the identification of each of the at least one indicium comprises a determination of whether a set of pixels of a plurality of pixels matches a known indicium, the plurality of pixels comprising the electronic image of the document.

21. The system of claim 19, wherein the identification of each of the at least one indicium comprises an identification of at least one predefined characteristic associated with the at least one indicium.

22. The system of claim 21, wherein the identification of each of the at least one indicium comprises an identification of a threshold number of predefined characteristics associated with the at least one indicium.

23. The system of claim 19, wherein the identification of each of the at least one indicium comprises:

(i) scanning a pixel of a plurality of pixels, the plurality of pixels comprising the electronic image of the document;

(ii) identifying a color value associated with the pixel of the plurality of pixels;

(iii) determining whether the pixel may be part of the at least one indicium based on the color value associated with the pixel;

(iv) updating a set of pixels of the plurality of pixels based on determining that the pixel may be part of the at least one indicium;

(v) determining whether a match between the set of pixels and the at least one indicium can be determined;

(vi) determining whether the set of pixels matches the at least one indicium if the match can be determined; and (vii) if the match cannot be determined, identifying a next pixel;

wherein the first logic is further executable by the processor to repeat steps (i)-(vii) using the next pixel if the match cannot be determined.

24. The system of claim 23, wherein the determination of whether a match between the set of pixels and the at least one indicium can be determined comprises:

a determination of whether a match between the set of pixels and at least one predefined characteristic of the at least one indicium can be determined; and a determination of whether the set of pixels matches the predefined characteristic if the match can be determined.

25. The system of claim 24, wherein the determination of whether the pixel may be part of the at least one predefined characteristic comprises a determination of whether the pixel has a non-white color value.

26. The system of claim 24, wherein a determination of whether the pixel may be part of the at least one predefined characteristic comprises a determination of whether the pixel has a value within a range of black color values.

27. The system of claim 19, wherein the at least one rule indicates one or more areas that may contain handwritten information.

28. The system of claim 19, wherein the at least one rule indicates one or more areas that may contain typographic information.

29. The system of claim 19, wherein the at least one rule indicates at least one of:

an area on the document that may contain information;

a size of the area;

a shape of the area;

whether the data comprises handwritten information;

whether the data comprises typographic information;

a processing method to extract the information;

a threshold condition indicating that the data can be extracted; and a second indicium needed to extract the data.

30. The system of claim 19, wherein the identification of each of the at least one indicium comprises:

identifying at least one predefined characteristic of the at least one indicium as a corner; and determining the lengths of two sides in connection with the corner.

31. The system of claim 30, wherein the identification of the at least one predefined characteristic comprises a determination of whether a set of pixels of a plurality of pixels matches a known predefined characteristic, the plurality of pixels comprising the electronic image of the document.

32. The system of claim 19, wherein the extraction of the data from the one or more designated areas on the electronic image of the document comprises an identification of color values of the pixels in the one or more designated areas.

33. The system of claim 19, wherein the extraction of the data from the one or more designated areas on the electronic image of the document comprises:
   (i) scanning a pixel of a plurality of pixels, the plurality of pixels comprising the one or more designated areas;
   (ii) identifying a color value associated with the pixel;
   (iii) determining whether the pixel may be part of the data based on the color value associated with the pixel;
   (iv) updating a set of pixels of the plurality of pixels based on a determination that the pixel may be part of the data;
   (v) determining whether the set of pixels completely represents the data;
   (vi) identifying a next pixel, the third logic further executable by the processor to repeat steps (i)-(v) using the next pixel if the set of pixels does not completely represent the data; and
   (vii) determining whether to perform an OCR process on the set of pixels.

34. The system of claim 19,
   wherein the first logic is further executable by the processor to identify a second indicium;
   wherein the second logic is further executable by the processor to determine at least a second rule associated with the second indicium; and
   wherein the third logic is further executable by the processor to extract data from the one or more designated areas using the second rule.

35. The system of claim 19, further comprising:
   fourth logic stored in the memory and executable by the processor to perform an error check, wherein the error check is selected from the group consisting of determining whether data was successfully extracted from the area, determining whether data is missing from the document, determining whether data was incorrectly entered on the document, and combinations thereof.

36. The system of claim 19, further comprising:
   a fourth logic stored in the memory and executable by the processor to generate a report of the data extraction, wherein the report comprises information selected from the group consisting of information identifying the document, data that was extracted, an error that was detected during data extraction, and combinations thereof, and wherein the error is selected from the group consisting of data was unable to be extracted from the image of the document, data is missing from the document, data is incorrectly entered on the document, and combinations thereof.

37. A system for extracting data from an electronic image of a document, the document having at least one indicium therein indicative of one or more designated areas, separate from the indicium, in which the data may be found, the system comprising:
   means for receiving the electronic document image;
   means for identifying each of the at least one indicium;
   means for determining, for each identified indicium, at least one rule associated with the identified indicium, wherein each of the at least one rule provides information regarding the data to be extracted and designates the one or more areas, separate from the indicium, in which the data to be extracted may be found, and each of the at least one rule further provides, wherein the information regarding the data to be extracted comprises type of data to be extracted, for how to extract the data, threshold for determining if the area contains the data to be extracted, or combinations thereof; and
   means for extracting data from only the designated one or more areas of the electronic image, wherein at least a portion of the information provided by the determined at least one rule guides extraction of the data from the one or more areas designated thereby.

\* \* \* \* \*